Oct. 9, 1962  H. J. SCHWERDHÖFER  3,057,227
MULTIPLE SPEED HUB
Filed Oct. 4, 1960

INVENTOR
Hans Joachim Schwerdhöfer
By Richard Ernst
Ag't

United States Patent Office 3,057,227
Patented Oct. 9, 1962

3,057,227
MULTIPLE SPEED HUB
Hans Joachim Schwerdhöfer, Schweinfurt (Main), Germany, assignor to Fichtel & Sachs A.G., Schweinfurt (Main), Germany, a corporation of Germany
Filed Oct. 4, 1960, Ser. No. 61,335
Claims priority, application Germany Oct. 10, 1959
14 Claims. (Cl. 74—750)

This invention relates to multiple-speed hubs for the driven wheels of bicycles and the like, and more particularly to a hub in which the several ratios of speed transmission are obtained from planetary gearing.

It is known to provide such hubs with a chain wheel to which motive power is transmitted by a chain from pedals or an engine, and which is fixedly connected with a driver member rotatable about a stationary hub shaft secured in the bicycle frame. The driver member cooperates with a coupling member having a hub portion axially slidable relative to the stationary shaft and several arms which slidably engage corresponding slots in the driver member. The driver member axially extends from the chain wheel to the planetary gearing to provide guiding support for the coupling member which engages the planetary gearing. The latter transmits the rotary motion of the driver member at a suitably altered speed ratio to the hub shell. Wire spokes mounted on the shell carry the wheel rim.

The coupling member is movable relative to the planetary gearing. This permits its selective engagement with respective elements of the gearing to produce the several transmission ratios of which the hub is capable. Overriding pawl couplings are preferably interposed between the gearing and the hub shell.

The fact that the driver member of the known hub extends substantially from the chain wheel to the planetary gearing, and must necessarily extend over substantially the full distance between these elements for adequate support of the coupling member, is a disadvantage of the known arrangement. The motion transmitting elements interposed between the chain wheel and the planetary gearing have a relatively large diameter which results in undesirably large overall dimensions of the hub. The shell must accommodate the combined radial thickness of the stationary shaft, of the hub portion of the coupling member, and of the slotted portion of the driver member. The wall thickness of the driver member must be adequate to transmit the necessary torque without failure at the slots. Since the driver member extends fully from the chain wheel to the planetary gearing it determines the position of the pawl coupling which is most advantageously mounted on the outer periphery of an internally geared ring member meshing with the planet wheels of the planet gearing, and thus the minimum diameter of the ring member and thereby the minimum diameter of the wheel hub depend on the dimensions of the driver member.

It is an important object of this invention to provide a multiple speed hub performing the functions of the described known hub, but capable of being contained in a hub shell of small external dimensions.

Another object is the provision of such a hub which may readily be protected against penetration of foreign matter, and is thus inherently capable of prolonged service free from maintenance work.

With these and other objects in view, the invention mainly consists in the provision of a coupling member rotatable about the axis of the stationary hub shaft and having two axially spaced portions of which one engages the driver member for joint rotation of the coupling member therewith, whereas the other portion engages the planetary gearing. Speed change is effected by axially moving the coupling member in such a manner that the aforementioned other portion thereof is shifted from engagement with one element of the planetary gearing into engagement with another element in a manner known in itself.

Because of the axial elongation of the coupling member which preferably is a sleeve member, the driver member is substantially shortened and does not have to extend axially from the chain wheel to the gearing. The axial length of the driver member need not be greater than is necessary to provide sufficient contact faces for engagement with the coupling sleeve. This is only a fraction of the minimum driver length inherently necessary with the afore-described known device. The coupling sleeve itself may be made of a diameter substantially smaller than that of the driver member and may preferably be movably mounted on the central shaft itself. The dimensions of the pawl coupling, and thus those of the internally geared ring member of the planetary gearing which carries the coupling, are no longer determined by the necessarily large diameter of the driver member, but by the substantially smaller diameter of the coupling sleeve.

When the known device is employed as a three-speed hub, the arms of the coupling member directly engage the bearing studs of the planet wheels at one of the three speeds. For reasons of manufacturing economy which are largely controlling in this highly competitive industry, the coupling member is conventionally made with two or four arms so that the slots in the driver member may be conveniently formed. The number of arms thus determines the number of planet wheels. The areas of contact between the arms and the bearing pins are small, and because of the limited number of bearing pins and arms, the contact pressures developed between the arms and the pins are inherently quite high. Any slight maladjustment or misalignment of the hub elements tends further to increase these pressures. Wear of the affected parts is a limiting factor in the useful life of the hub and deterioration is strongly accelerated by any mistakes in the maintenance of the hub.

To overcome this shortcoming of the known hub, it has previously been proposed to enlarge the contact areas in an axial direction. This involves longer axial travel of hub elements to effect change of speeds, increased axial length of the entire hub, and an increase in the dimensions of the switch by means of which the rider can actuate speed change. This solution thus is not entirely satisfactory.

It is another disadvantage of the afore-described known device that there is inherently substantial play between the arms of the coupling member and the cooperating portion of the planet bearing studs. The hub thus has appreciable back-lash which is noticeable particularly during transition from braking or from free-wheeling to pedaling. The pedals intially move through an arc without encountering any resistance in a manner unpleasant to many riders.

A further object of the invention is to provide a multiple speed hub which is free from the several secondary limitations of the known devices enumerated in the preceding paragraphs.

According to a more specific feature of the invention the coupling sleeve is equipped with gear teeth which respectively mesh with corresponding gear teeth on the planet carrier or on the internally geared ring member meshing with the planet wheels in the several axial positions of the coupling sleeve. According to another preferred feature of the invention, the planet carrier has a toothed ring mounted on the several bearing studs of the planet wheels for meshing engagement with the gear teeth of the coupling sleeve. The gear teeth of the latter are shifted into meshing engagement with the corresponding gear on the internally geared ring member or on the planet for effecting speed changes.

Other features and many of the attendant advantages of this invention will be readily appreciated as the same becomes better understood by reference to the following detailed description when considered in connection with the accompanying drawing in which like reference numerals designate like parts throughout the figures thereof, and wherein.

Figure 1:
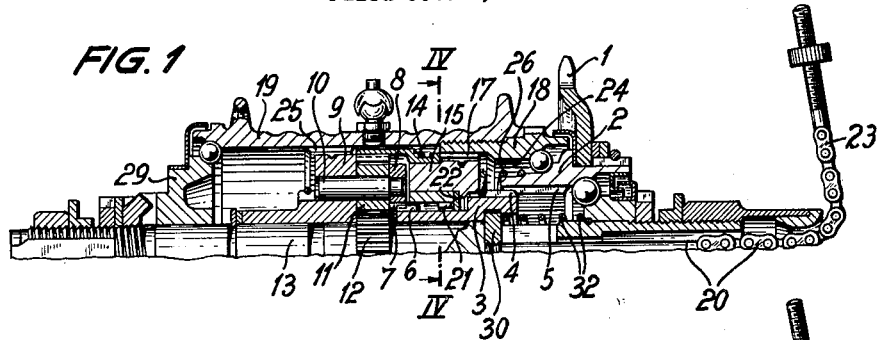
FIG. 1 shows a preferred ambodiment of the multiple speed hub of the invention in axially sectional view, only one half of the hub being seen, the other half being substantially a mirror image of the illustrated section, with the hub elements in position for high speed.
Figure 2:
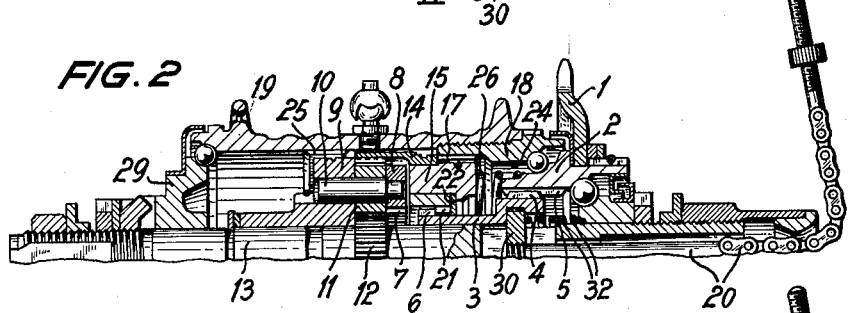
FIG. 2 shows the hub of FIG. 1 with its elements in position for intermediate speed.
Figure 3:
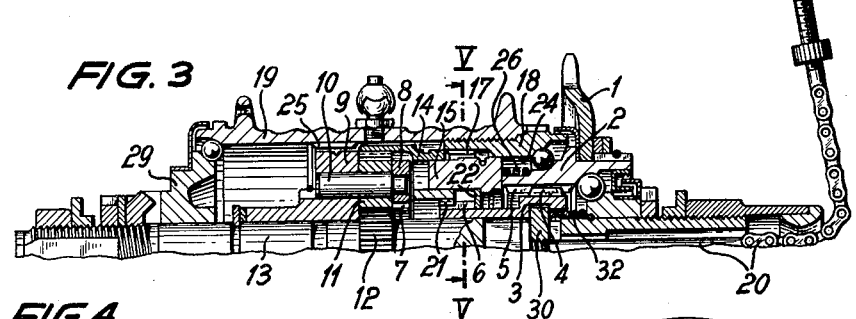
FIG. 3 is a corresponding view of the hub of FIG. 1 set for low speed.

Referring now to the drawing in detail and initially to FIGS. 1 to 3, there is seen a three-speed bicycle hub in radial half-section. It is carried on a stationary shaft 13 equipped to be mounted in a bicycle frame in the usual manner, and enclosed in a driving hub shell 19 coaxial with the shaft. Power is transmitted to the hub by a chain (not shown) trained over a chain wheel 1 fixedly fastened on a driver member 2. The driver member is rotatable on the shaft 13 by means of a ball bearing and is axially secured on the shaft. It carries one axial end of the hub shell 19 by means of a second ball bearing, whereas the other axial end of the hub shell is rotatably supported on a ball bearing including a bearing member 29.

The driver member 2 meshes with a coupling sleeve 3 which is rotatable and axially slidable on the shaft 13. An axially elongated external spur gear 4 on one axial end portion of the sleeve 3 engages a corresponding internal gear 5 on the driver member 2 in such a manner as to ensure motion transmission in all axial positions of the sleeve 3. The other axial end portion of the coupling sleeve 3 carries an external spur gear rim 6 which is selectively engageable with several elements of the planetary gearing of the hub depending on the axial position of the sleeve.

In the position illustrated in FIG. 1, the spur gear rim 6 meshes with a corresponding internal gear 7 on a ring 8 which is fastened to axial extensions of the several eccentric studs 10 on a planet carrier or spider 9 which is rotatable but axially fixed on the shaft 13. Only one stud 10 is visible in the drawing, but at least two are preferably provided, each carrying a planet wheel 11 meshing with a sun wheel 12 fastened to the shaft 13.

Figure 4:
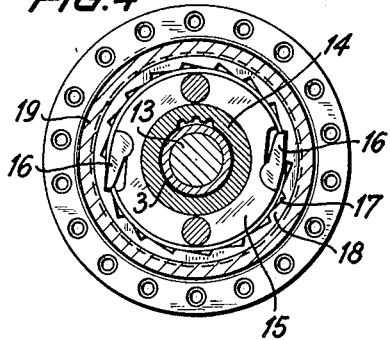
FIG. 4 shows the apparatus of FIG. 1 in radical section on the line IV—IV.
Figure 5:
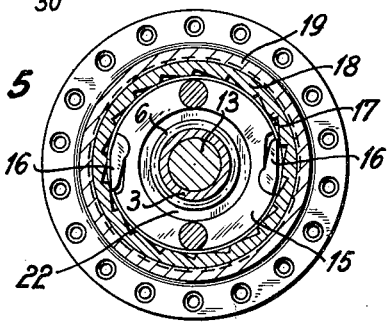
FIG. 5 illustrates the device of FIG. 3 in radial section on the line V—V.

The planet wheels 11 meshingly engage an internally geared ring member 14 provided with an axially extending annular recess in which a pawl carrier 15 is axially movable but secured against rotation. The pawl carrier has pawls 16 pivoted thereto as best seen from FIGS. 4 and 5. The pawls 16 cooperate with an annular ratchet 17 mounted on a bearing bushing 18 on the hub shell 19 to form an overriding pawl clutch.

Axial movement of the coupling sleeve 3 is actuated by a slide 30 which is guided in a slot in the tubular shaft 13 and the movements of which are controlled by a control rod 20 axially movable in the central bore of the shaft 13 and subject to the rider's actions by means on a control gear which includes a chain 23 and other elements such as a switch lever on the bicycle frame or handle bars. Since these other elements are conventional and well known as to structure and function, they have not been shown and will not be further described. The slide 30 engages an annular radial recess in the coupling sleeve 3. A helical spring 32 (FIG. 2) abutting against a stationary hub member and against the slide 30 urges the latter, and thereby the coupling sleeve 3 to move toward the left, as viewed in FIGS. 1 to 3, that is, into the high speed position of the hub illustrated in FIG. 1, in which the external gear rim 6 meshes with the internal gear 7 of the ring 8.

A helical spring 26 similarly urges the pawl carrier 15 to move toward the left, as viewed in FIGS. 1 to 3, into the recess of the ring member 14. Inward movement of the pawl carrier under the urging of the spring 26 is limited by abutment of an annular disk 22 integral with the pawl carrier 15 against a frontal face of an internal gear 21 on the ring member 14 which is adapted to engage the external spur gear rim 6 of the coupling sleeve 3 as will be discussed in more detail hereinafter.

The planet carrying spider 9 is provided with peripheral pawls 28 (FIG. 2) similar to the pawls 16. The pawls 28 cooperate with an annular ratchet 25 internally fastened to the hub shell 19 to form a second overriding pawl clutch. This second clutch is permanently engaged whereas the first clutch formed by the pawls 16 and the ratchet 17 may be disengaged by axial movement of the pawl carrier 15 into the position illustrated in FIG. 3 in which the pawls 16 are axially aligned with a smooth internal wall portion 24 of the bearing bushing 18. The pawl springs acting on the pawls 16 and 28 have been omitted from the drawing for the sake of clarity.

The afore-described apparatus operates as follows:

When its elements are positioned as shown in FIG. 1 by relaxation of the tension of the chain 23, the hub is set for high speed. The helical spring 32 urges the coupling sleeve 3 to move toward the left, as viewed in FIG. 1, so that the external gear rim 6 of the coupling sleeve engages the internal gear 7 of the ring 8 on the spider 9. The helical spring 26 simultaneously urges the pawl carrier 15 toward the left so that its pawls 16 engage the ratchet 17 on the bearing bushing 18.

The torque transmitted to the chain wheel 1 is thus imparted to the drive member 2, and further by the coupling sleeve 3 to the spider 9 which is made to rotate. The planet wheels 11 mesh with the sun wheel 12 and thereby rotate the internally geared ring member 14 at a rotary speed greater than that of the chain wheel 1. The ring member 14 entrains the hub shell 19 by means of the pawl carrier 15 and the pawl clutch constituted by the pawls 16 and the ratchet 17.

When tension of the chain 23 moves the sleeve coupling 3 against the restraint of the spring 32 into the position illustrated in FIG. 2, the gear rim 6 is shifted from engagement with the gear 7 of the ring 8 into meshing engagement with the internal gear 21 on the ring member 14. The pawl carrier 15 still maintains its earlier position under the urging of the spring 26, and the pawls 16 remain engaged in the ratchet 17.

Motion is transmitted from the chain wheel 1 and the driver member 2 by the coupling sleeve 3 to the internally geared ring member 14, and thence by the pawl carrier 15 and the pawls 16 to the hub shell 19. The shell rotates at the same rotary speed as the chain wheel 1. The gear elements 9, 10, 11, and 12 of the planetary gearing idle.

Further applied tension of the chain 23 finally moves the coupling sleeve 3 into the position seen in FIG. 3 in which its gear rim 6 still engages the internal gear 21 of the ring member 14. Abutting cooperation between the radial end face of the gear rim 6 and the annular disk 22 on the pawl carrier 15 has displaced the latter toward the right against the restraint of the helical spring 26 so that the pawls 16 no longer engage the ratchet 17 and register with the smooth internal wall portion 24 of the bearing bushing 18.

The torque of the chain wheel 1 is transmitted to the hub shell 19 by the driver member 2, coupling sleeve 3, and the internally geared ring member 14 which rotates the planet wheels 11. The wheels because of their meshing engagement with the stationary sun wheel 12 actuate rotation of the spider 9 at a reduced speed which is transmitted to the hub shell 19 by the second pawl clutch constituted by the pawls 28 and the ratchet 25. The hub is in slow speed.

The space within the hub shell 19 is not completely filled by the compact multiple speed transmission as is evident from FIGS. 1 to 3. Additional devices, such as a brake, can conveniently be housed in the shell without crowding or without an undue increase in shell dimensions. The modest space requirements of the transmission arrangement permit additional space to be devoted to dust and moisture tight seals which in themselves contribute substantially to the useful life and to the reliability of the multiple speed hub.

The number of planet wheels employed in the planetary gearing is no longer fixed by external factors such as the number of arms on a coupling member because of the transmission of motion from the coupling sleeve 3 of the invention to the spider 9 by the gears 6 and 7. The number of planet wheels may thus be chosen at will to suit desired operating characteristics, and particularly the transmission ratios of the hub. The studs 10 of the wheels 11 do not individually transmit power from a coupling member to the spider as in the afore-described known devices, but do so jointly because of their connection by the ring 8. They may thus be spaced about the axis of the shaft 13 in an angularly symmetrical arrangement but they are not inherently limited to symmetrical spacing.

All power is transmitted in the hub by gearing in which the contact areas available are relatively large, the resulting contact pressures therefore low. The multiple speed hub of the invention is thus relatively immune against rapid wear. The axial path of the coupling sleeve 3 between the several speed positions is short, and the speed control mechanism need perform but small movements which contribute to the increased convenience of the rider. The back lash of the hub of the invention is inherently very small.

It should be understood of course that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What is claimed and described to be protected by Letters Patent of the United States is:

1. In a multiple-speed hub for a bicycle and the like, in combination, a shaft having an axis; hub shell means rotatable on said shaft about said axis; multiple speed planetary gearing in driving engagement with said shell means and including a plurality of gear elements; a driver member rotatable about said axis and axially spaced from said gearing; gear means on said driven member; means for actuating rotation of said driver member; a coupling member rotatable about said axis; two axially spaced gears on said coupling member, one of said gears meshing with the gear means on said driver member for joint rotation of said coupling member and said driving member, said coupling member being axially movable between a plurality of positions for selective meshing engagement of the other gear mounted on said coupling member with respective gear elements of said planetary gearing.

2. In a hub as set forth in claim 1, said gears being integral with said coupling member.

3. In a hub as set forth in claim 1, said gear means projecting radially inward from said driver member and said gears projecting radially outward from said coupling member.

4. In a hub as set forth in claim 1, said coupling member being tubular and slidable on said shaft for rotary and axial movement.

5. In a hub as set forth in claim 1, said gear elements of said planetary gearing including a planet carrier rotatable on said shaft and carrying a plurality of planet wheels, and a ring member having an internal face meshing with said wheels.

6. In a hub as set forth in claim 5, a plurality of bearing members on said planet carrier, said planet wheels being rotatable on respective ones of said bearing members; and an annular gear member mounted on said plurality of bearing members for meshing engagement with said other gear on said coupling member.

7. In a hub as set forth in claim 1, a plurality of pawl clutches each having a driving element operatively connected to one of said gear elements and a driven element operatively secured to said shell means.

8. In a hub as set forth in claim 7, said gear elements of said planetary gearing including a planet carrier rotatable on said shaft and carrying a plurality of planet wheels, and an internally geared ring member meshing with said wheels, the driving element of one of said pawl clutches being mounted on said ring member, and the driving element of another pawl clutch being mounted on said planet carrier, said driving element of said one clutch being axially movable on said ring member into and out of engagement with the driven element of said one clutch.

9. In a hub as set forth in claim 8, said ring member being formed with an annular recess, the driving element of said one pawl clutch including a pawl carrier axially movable in said recess and pawl means mounted on said pawl carrier, the driven element of said one clutch being a ratchet ring secured on said shell means and engageable by said pawl means.

10. In a hub as set forth in claim 9, an annular member fastened on said pawl carrier and slidable on said coupling member; abutment means on said coupling member engageable with said annular member for actuating joint axial movement of said pawl carrier with said coupling member in one direction, and resilient means for urging said pawl carrier to move in a direction opposite to said one direction.

11. In a multiple-speed hub for a bicycle and the like, in combination, a shaft having an axis; hub shell means rotatable on said shaft about said axis; multiple speed planetary gearing in driving engagement with said shell means, said gearing having a plurality of gear elements including a planet carrier rotatable on said shaft and carrying a plurality of planet wheels, and an internally geared ring member meshing with said wheels; a plurality of pawl clutches, each having a driving element and a driven element, the driven elements of said clutches being operatively secured to said shell means, the driving element of one of said pawl clutches being mounted on said ring member, and the driving element of another pawl clutch being mounted on said planet carrier, said driving element of said one clutch being axially movable on said ring member into and out of engagement with the driven element of said one clutch; a driver member rotatable about said axis and axially spaced from said gearing; means for actuating rotation of said driver member; and a coupling member rotatable about said axis and having two axially spaced portions, one of said portions being connected to said driver member for joint rotation of said coupling member with said driver member, said coupling member being axially movable between a plurality of positions for selective motion-transmitting engagement of the other portion thereof wtih respective gear elements of said planetary gearing.

12. In a hub as set forth in claim 11, abutment means on said coupling member for actuating joint axial movement of said driving element of said one pawl clutch with said coupling member in one direction, and resilient means for urging said driving element to move in a direction opposite to said one direction.

13. In a hub as set forth in claim 12, a gear rim on said other coupling member portion for meshing engagement with said respective gear elements, said gear rim having a radial front face constituting said abutment means.

14. In a hub as set forth in claim 1, control means for actuating axial movement of said coupling member between said plurality of positions thereof.

References Cited in the file of this patent
FOREIGN PATENTS

| | | |
|---|---|---|
| 370,830 | Great Britain | Apr. 14, 1932 |
| 765,236 | Germany | Oct. 5, 1950 |
| 140,659 | Sweden | June 2, 1953 |